United States Patent [19]
Youmans et al.

[11] Patent Number: 5,984,616
[45] Date of Patent: *Nov. 16, 1999

[54] VARIABLE PIVOT TOWING DEVICE

[75] Inventors: Gordon D. Youmans; Audrey L. Youmans, both of Anderson, Calif.

[73] Assignee: Prime Technologies, Inc., Gardnerville, Nev.

[*] Notice: This patent issued on a continued prosecution application filed under 37 CFR 1.53(d), and is subject to the twenty year patent term provisions of 35 U.S.C. 154(a)(2).

[21] Appl. No.: 08/752,569

[22] Filed: Nov. 21, 1996

[51] Int. Cl.⁶ .............................. B65G 1/00; B66C 1/00; B60P 3/06

[52] U.S. Cl. .......................... 414/563; 280/402; 414/226

[58] Field of Search .................... 414/563, 426, 414/428; 280/402

[56] References Cited

U.S. PATENT DOCUMENTS

| | | | |
|---|---|---|---|
| 3,924,763 | 12/1975 | Pigeon | 414/563 |
| 3,929,237 | 12/1975 | Schaedler | 414/563 |
| 4,186,938 | 2/1980 | Youngblood | 414/563 |
| 4,679,978 | 7/1987 | Holmes et al. | 414/563 |
| 4,993,911 | 2/1991 | Grant | 414/563 |
| 5,064,078 | 11/1991 | Van Staveren | 212/180 |
| 5,123,802 | 6/1992 | Bell | 414/563 |
| 5,326,216 | 7/1994 | Russ | 414/563 |
| 5,352,083 | 10/1994 | Roberts et al. | 414/563 |

FOREIGN PATENT DOCUMENTS 2198401  6/1988  United Kingdom ................... 414/563

*Primary Examiner*—Christopher P. Ellis
*Assistant Examiner*—Raymond B. Johnson
*Attorney, Agent, or Firm*—Thomas Schneck; John P. McGuire, Jr.

[57] ABSTRACT

A towing device, adapted to be mounted to a chassis of a vehicle, features a bi-planar rotation mechanism which allows a telescoping beam to dynamically pivot about two orthogonal axes. The towing device includes a sub-frame mounted to the chassis. An underframe is pivotally attached to the sub-frame to move between a retracted position, adjacent to the sub-frame, and an extended position, distal from the sub-frame. The telescoping beam extends from the underframe and terminates in a carriage, which is adapted to support the wheels of a towed vehicle. In this fashion, the telescoping beam allows the towed vehicle to dynamically pivot about two orthogonal axes which avoids "high centering" of the towing vehicle.

8 Claims, 4 Drawing Sheets

VARIABLE PIVOT TOWING DEVICE

TECHNICAL FIELD

The present invention pertains to the field of vehicle towing devices. Specifically, the present invention pertains to a lightweight towing device ideally suited for motor homes.

BACKGROUND ART

Devices for towing vehicles are well known in the art and generally consist of a wheel lift system attached to a towing vehicle. The wheel lift system is adapted to support the wheels of a vehicle to be towed. One end of the towed vehicle is then elevated by a hydraulic mechanism, with the longitudinal axis of the towed vehicle forming an obtuse angle with respect to the ground. Vehicle towing devices may be organized into two categories, commercial and consumer. Commercial vehicle towing devices are commonly associated with tow trucks and are mounted so that the towing devices extend from the towing vehicle on a continuous basis. This facilitates quick and easy access to the towing devices which makes the business of towing more profitable by reducing the time necessary to attach and detach vehicles to the towing device.

Consumer vehicle towing devices are, on the other hand, not typically designed to extend from the towing vehicle on a continuous basis. This results from both the periodic nature of the use of consumer vehicle towing devices, as well as the desire to avoid the driving difficulty presented by having the same extending from the towing vehicle. Further, vehicle towing devices often detract from the aesthetics of the towing vehicle. Thus, most consumer towing devices are designed to be removably mounted to the towing vehicle so that they may be easily removed. An example of a prior art consumer towing device is a removable two-ball.

U.S. Pat. No. 4,993,911 to Grant discloses a commercial towing device that comprises of a mobile crane for a towing truck. The crane includes, inter alia, a boom that is operably connected to hydraulic rams to vary the boom's longitudinal and angular positions. The boom is pivotally mounted to a mast structure. Both the hydraulic rams and the mast structure are braced against a pivot structure that is secured to the bed of the truck. In this fashion, horizontal components of forces produced during lifting and towing of a load, and imposed by the hydraulic rams, is offset by the opposing horizontal components of forces imposed upon the braces by the load.

U.S. Pat. No. 5,064,078 to Van Staveren discloses another commercial towing device that is a combination portable hoist, crane and vehicle towing apparatus. As a portable hoist, a vertical mast and hydraulically actuated boom are mounted on a standard support having support legs oriented in a "V", with the hoist boom positioned between the support legs. As a portable crane, the mast and boom are mounted onto a platform attached to a truck bumper to allow 360° rotation about an axis of the vertical mast. In this configuration, the portable crane can load and remove objects to/from a bed of a truck. As an automobile towing mechanism, the mast and boom are locked in position within the plane of movement of the boom normal to the vehicle bumper. A typical automobile bumper and axle attachment towing device is attached to the boom chain. Stabilizer bars orient the bumper and axle attachment towing device parallel to and spaced-apart from the vehicle bumper. This allows the tow vehicle to elevate one end of a towed vehicle.

U.S. Pat. No. 5,123,802 to Bell discloses still another commercial towing device for a motorcycle which includes a wheel lift adapter kit having, inter alia, a plurality of rigid bars which form a pair of spaced cradles, each of which is attached to a cross bar assembly. The cross bar assembly is attached to one end of a retractable boom. The opposite end of the boom is attached to the rear of a towing vehicle. The boom is telescoping and may be pneumatically or hydraulically extended or retracted. The boom is pivotally mounted to the rear of the vehicle so that it may be lowered to the ground or raised therefrom, elevating a motorcycle.

U.S. Pat. No. 5,326,216 to Russ discloses a commercial vehicle towing device for trucks which includes, inter alia, a frame having a pair of spaced-apart channels terminating in a tail positioned at the rear of the truck. A base is movably mounted within the channels. The base includes a subtending pivoting arm. The arm extends from the base, terminating in a telescoping housing. The housing is positioned to extend from the rear of the truck to which it is attached and terminates in a support member that extends transverse to the telescoping housing. Each end of the support member terminates in a wheel mount adapted to selectively engage the wheels of a vehicle to be towed. A first hydraulic mechanism is connected between the tail mount and the base to move the base along the channels. A second hydraulic mechanism is connected between the tail mount and the telescoping housing to lower and raise the housing closer to and farther from the ground. A third hydraulic mechanism is connected between the wheel mounts to vary the distance therebetween.

A major concern with a towing device concerns avoiding damage to the towed vehicle, the towing vehicle and the towing device when crossing over uneven terrain, e.g., a dip in the ground, a ramp or a drive-way. When the rear end of the towing vehicle, and front end of towed vehicle traverse opposing sides of a recess in the ground, the rigidity of the towing device may cause the rear wheels of the towing vehicle to be lifted off the ground, referred to as "high centering". This may subject the towing device to undue strain, resulting in catastrophic failure of the same.

It is an object, therefore, of the present invention to provide a towing device that facilitates traversing uneven terrain by avoiding high centering of a towing vehicle.

It is a further object of the present invention to provide a lightweight towing device that is easily stored underneath the towing vehicle.

SUMMARY OF THE INVENTION

These objects have been achieved by having a towing device, adapted to be mounted to a chassis of a vehicle, that features a bi-planar rotation mechanism which allows rotational movement between the towing vehicle and a towed vehicle about two orthogonal axes. The towing device includes a sub-frame mounted to the chassis and an underframe pivotally attached to the sub-frame to move between a retracted position, adjacent to the sub-frame, and an extended position, distal from the sub-frame. The bi-planar rotation mechanism includes a telescoping beam mounted to the underframe to dynamically pivot about two orthogonal axes. The telescoping beam extends from the underframe and terminates in a carriage, which is adapted to support the wheels of a towed vehicle. Also provided is a modified sliding-block linkage attached between the sub-frame and the underframe. The modified sliding-block linkage dynamically retracts the underframe to provide greater vertical clearance between the towing device and the ground. The modified sliding-block linkage comprises a pair of spaced-apart bearing chambers formed in the sub-frame; a pair of spaced-apart hydraulic cylinders, each of which is pivotally coupled to the underframe, with the remaining end being coupled to the bearing chamber via a link; and a resilient member, coupled between each hydraulic cylinder and the sub-frame. Each link is movably mounted to one of the bearing chambers. The resilient member is coupled to resiliently bias the links to one end of the bearing chambers.

The carriage includes a cross member extending transverse to the telescoping beam. Pivotally attached to opposite ends of the cross member is a guide rod having a hollow tube slidably engaged with the guide rod. Each hollow tube includes a support plate. Each support plate is adapted to receive a tire of a towed vehicle. Each guide rod is connected to pivot between 120° and 180° so that each support plate may extend between stored and loading positions. In the stored position, the support plates are adjacent to the sub-frame and in the loading position, the support plates are distal therefrom. In this fashion, the towing device may be stored adjacent to the underframe of the towing vehicle.

In one embodiment, a hydraulic assembly is coupled to the towing device to facilitate hydraulic control of the beam, as well as the position of the support with respect to the sub-frame. Additionally, a dolly assembly may be attached between the support plates. The dolly assembly includes two spaced-apart wheels which provide additional strength to the towing device, thereby making the same suitable for heavy vehicles.

BEST MODE FOR CARRYING OUT THE INVENTION

Figure 1:
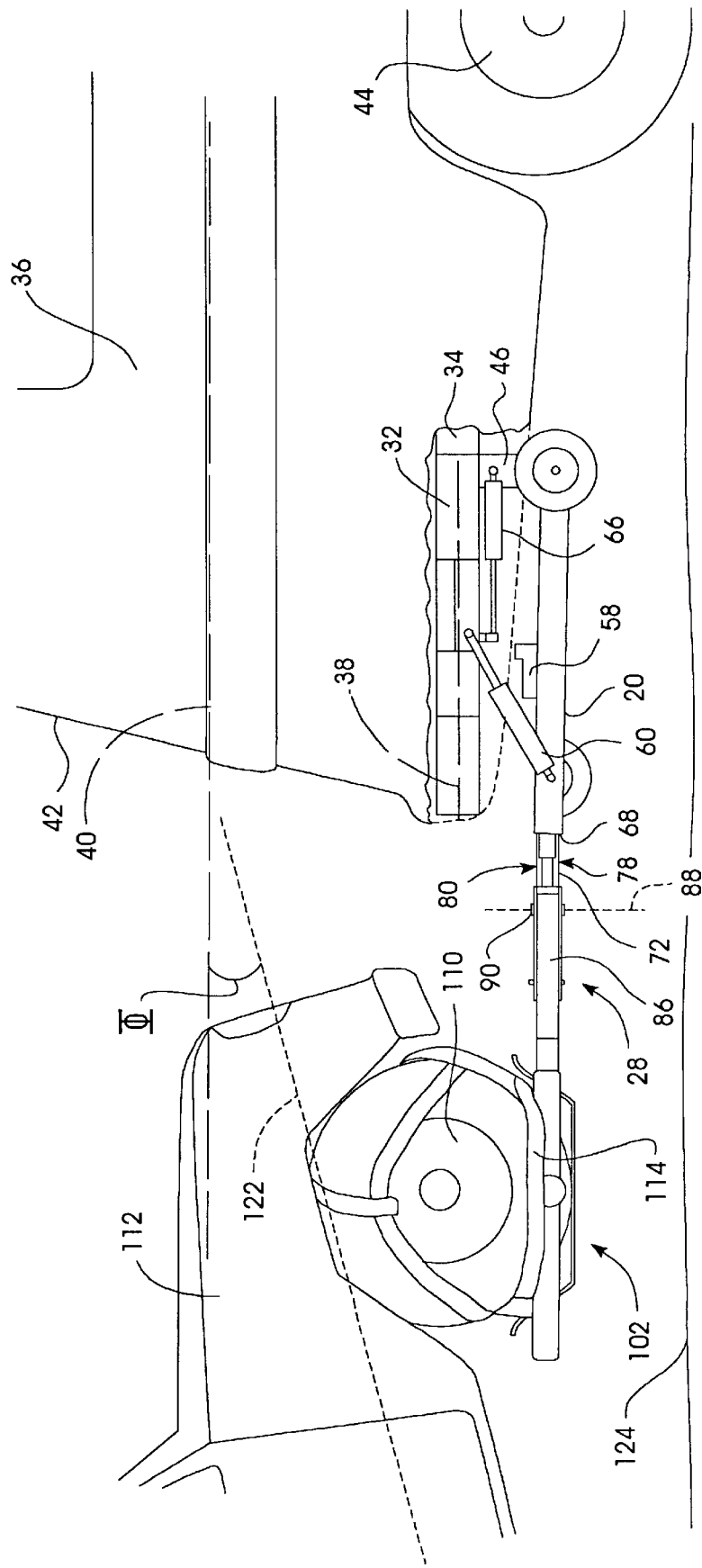
FIG. 1 is a side view of the present invention coupled between a towing vehicle and a vehicle being towed.
Figure 2:
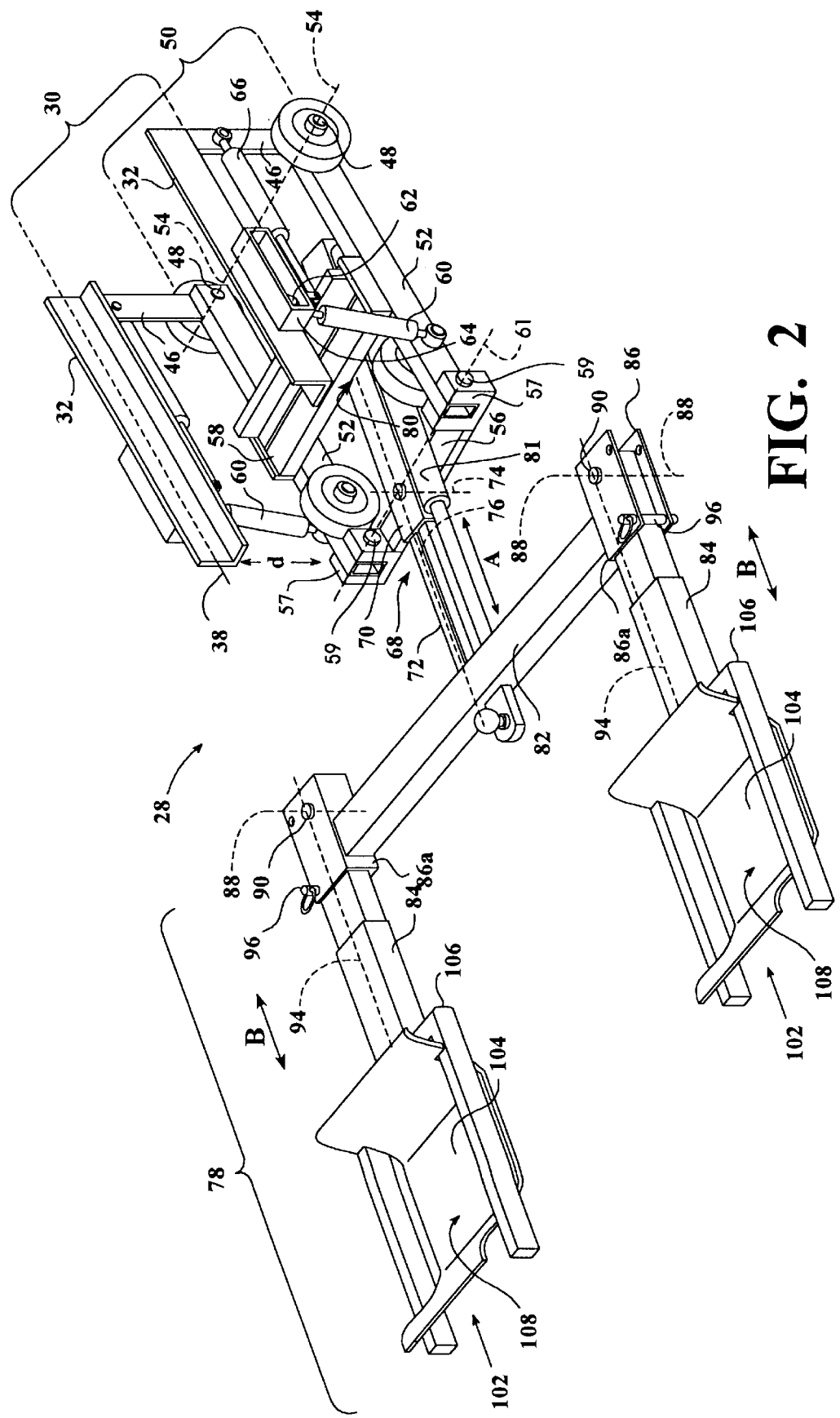
FIG. 2 is a perspective view of the towing device shown in FIG. 1.

Referring to FIGS. 1 and 2, a towing device 28 includes a sub-frame 30 having two spaced-apart, and parallel, "L" braces 32 mounted to a chassis 34 of a towing vehicle 36 such that a longitudinal axis 38 of each of the L-braces is parallel to a longitudinal axis 40 of the towing vehicle. Each of the L-braces 32 is positioned between a rear portion 42 and the rear wheels, one of which is shown as 44, of the towing vehicle 36. One end of each of the L-braces 32 is located proximate to the rear portion 42, with each of the L-braces 32 extending toward the rear wheels, terminating in a headstock 46.

The headstocks 46 are spaced-apart and parallel to each other, extending transverse to the longitudinal axes 38 and 40. Each of the headstocks 46 is connected to a trunnion 48 of an underframe 50. Each trunnion 48 protrudes from one of a pair of spaced-apart, and parallel, lever arms 52, fitting within an orifice (not shown) of one of the headstocks 46. In this manner, the underframe 50 is mounted to the sub-frame 30 to pivot about axis 54. The lever arms 52 extend coextensive with the L-braces 32.

Extending between the ends of the lever arms 52, disposed opposite to the trunnions 48, is a girder 56. Each end of the girder 56 includes a yoke member 57. Each yoke member 57 is adapted to receive one of the lever arms 52. An axle 59 extends through each yoke member 57 and the corresponding lever arm 52, pivotally attaching girder 56 to the underframe 50. In this manner, girder 56 rotates about axis 61, which extends parallel to axis 54. A bearing member 58 also extends between the two lever arms 52, parallel to girder 56. Bearing member 58 is positioned between the trunnions 48 and the girder 56.

A pair of hydraulic cylinders 60 are connected between the underframe 50 and the sub-frame 30 to vary the distance "d" therebetween by pivoting underframe 50 about axis 54. Specifically, one end of each of the hydraulic cylinders 60 is pivotally connected to one of the lever arms 52, with the remaining end being coupled to sub-frame 30 to form a modified sliding-block linkage. Each sliding block linkage includes a link 62, a bearing box 64, a resilient member 66 and one of the hydraulic cylinders 60, whereby the hydraulic cylinders 60 form the journals of the modified sliding block linkage. Each link 62 is attached to an end of a hydraulic cylinder 60, opposite to the end which is attached to the lever arm 52. The bearing box 64 extends from one of the L-braces 32, and the link 62 is disposed within the bearing box 64 to move therein. The resilient member 66 is typically a shock absorber connected between the link 62 and the headstock 46, resiliently biasing the link 62 toward one end of the bearing box 64.

A telescoping beam 68 is attached to the girder 56 and includes a housing 70 and a shaft 72. The housing 70 is pivotally attached to the girder 56 with the pivot axis 74 preferably being centered between the lever arms 52 and located on a longitudinal axis 76 of the beam 68. Axis 74 extends orthogonally to axis 61. The portion of the housing 70,which rests against the girder 56 at the pivot axis 74 defines a first journal portion. The housing 70 extends from the first journal portion toward the headstock 46, defining a second journal portion which rests against the bearing member 58. Preferably, the first and second journal portions are disposed on opposite sides of the beam 68. To that end, the first journal portion is typically positioned on the lower surface (not shown) of the housing and the second journal portion is disposed on the upper surface 80 of the housing, shown more clearly in FIG. 2. This forms a bi-planar rotation mechanism with telescoping beam 68 rotating about two orthogonal axes 61 and 74, and increases the strength of the underframe 50, which is discussed more fully below.

Referring again to FIG. 2, the shaft 72 is movably attached to the housing 70 to extend outwardly from the girder 56 away from the headstock 46, terminating in a carriage 78. In this manner, the shaft 72 may be moved parallel to axis 76 in the direction shown by arrow A, thereby lengthening or shortening the effective length of the beam 68. Although shaft 72 may be moved manually, and held in a fixed position using conventional techniques, it is preferred that a hydraulic mechanism 81 be coupled between the housing and the carriage to move shaft 72 along direction A.

The carriage 78 includes a cross member 82 extending transverse to the telescoping beam 68. A guide rod 84 is pivotally attached to a yoke 86 located at each end of the cross member 82. The yoke 86 includes an orifice (not shown) and is adapted to receive one end of the guide rod 84 so that the orifice (not shown) in the yoke 86 aligns with an orifice (not shown) in the guide rod 84. The guide rod 84 is attached to pivot about axis 88 by a pinion 90 placed into the orifices (not shown) of both the yoke 86 and the guide rod 84. The pinion 90 is secured in place using conventional techniques. A hollow tube 92 is slidably engaged with the guide rod 84 to move along a longitudinal axis 94 of the guide rod 84 in the direction indicated by arrow B. Preferably, the guide rod 84 is attached to rotate in the range of 120° to 180° about axis 88, between a stored and a loading position. In the stored position, the guide rod 84 is disposed between cross member 82 and head stock 46.

In the loading position, the guide rod 84 extends from the cross member 82 away from the first journal portion, thereby distally positioning the guide rod 84 from the lever arm 52. The rotational position of the guide rod 84 is maintained in place by inserting a detent 96 into openings in the yoke 86, wedging the guide rod 84 between a closed portion 86a of the yoke and the detent 96.

Each guide rod 84 includes a plurality of apertures 98. Each hollow tube 92 includes a locking pin 100 that is positioned to be received within one of the apertures 98 of the guide rod 84. The locking pin 100 is resiliently biased in the direction of the guide rod 84 to be received within one of the apertures, thereby fixing the relative positions of the guide rod 84 and the hollow tube 92. In this manner, the effective length of the carriage 78 may be varied along a direction parallel to arrow B.

A support structure 102 extends from each end of the hollow tubes 92, parallel to axis 94. Each support structure is designed to support a tire 110 of an automobile 112, shown more clearly in FIG. 1. Referring to FIGS. 1 and 2, each support structure 102 includes a rectangular support plate 104 that extends from the hollow tube 92. One end of the plate 104 is positioned against the hollow tube 92 with two sides being flanked by a frame 106. The plate 104 is disposed so that the hollow tube 92 and the frame 106 are raised above the plate 104, defining a recess 108 in which the tire 110 rests. The support structure 102 is adapted to retain the tire 110 of the vehicle 112 being towed within the recess 108. A harness assembly 114 may be attached to securely affix the tire to the support structure.

Figure 4:
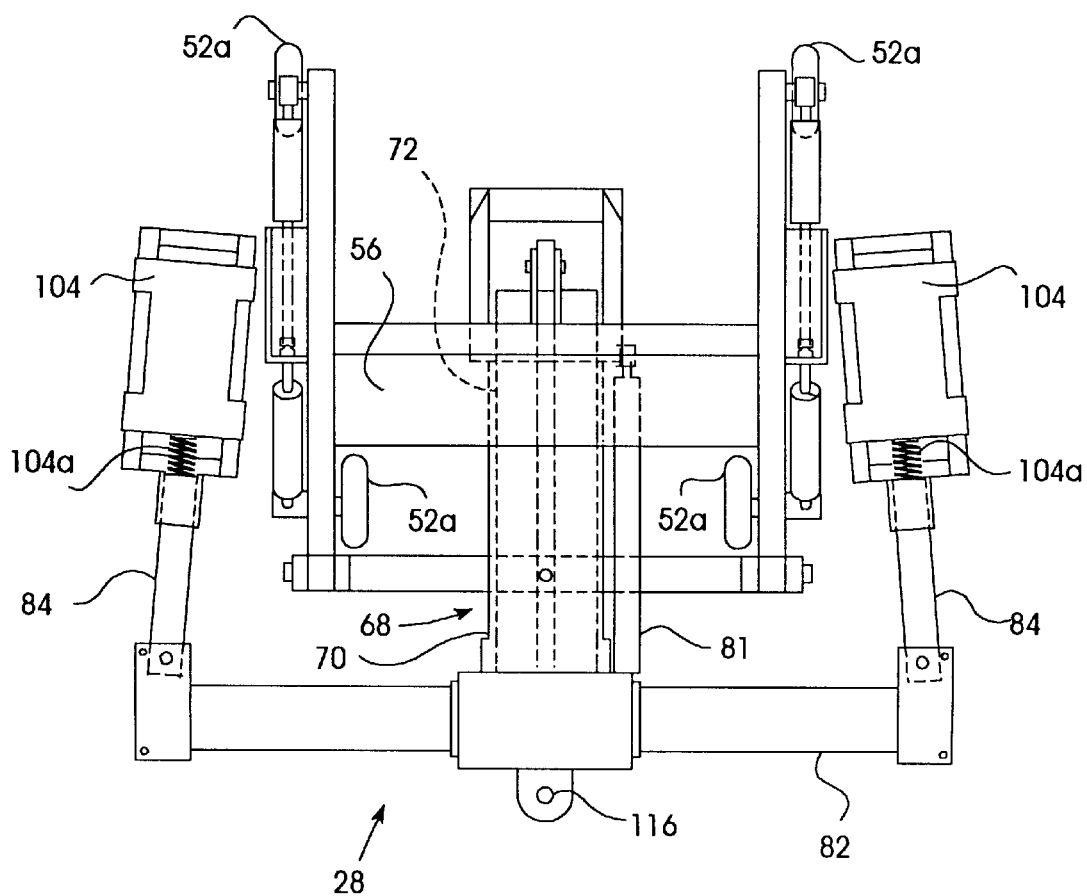
FIG. 4 is a top down view of the present invention shown in FIG. 3.

Referring to FIGS. 1 and 4, to reduce the damage that may occur when turning sharp corners, support plate 104 is resiliently biased via spring assembly 104a to move parallel to axis 94. For example, should the towing vehicle 36 make too sharp of a turn, the rear portion 46 of the towing vehicle 36 may impact with the front of the towed vehicle 112. By having support plate 104 resiliently biased to move parallel to axis 94, the towed vehicle may automatically adjust its position on the carriage 78 to reduce the damage sustained from the impact.

Figure 3:
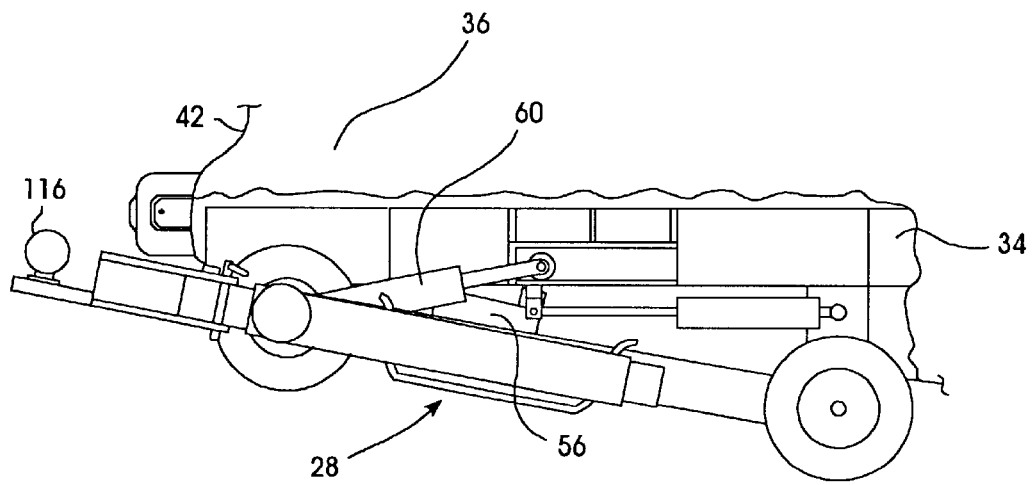
FIG. 3 is a side view of the present invention stored underneath a towing vehicle.

Referring also to FIGS. 3 and 4, the towing device 28 is shown in a stowed position. In the stowed position, beam 68 is in a fully retracted position, with the shaft 72 of the beam 68 completely encased within the housing 70. An important factor of the towing device 28 is to minimize its thickness, which facilitates storage of the same in the fully retracted position. To that end, the hydraulic mechanism is attached outside of the housing 70, which allows beam 68 to be thin without sacrificing strength. Retracting beam 68 is accomplished by placing hydraulic mechanism 81 in a fully retracted position. Each guide rod 84 is in the stored position, as discussed above, with support structure 102 typically being disposed between guide rod 84 and both the sub-frame 30 and the underframe 50. To provide the greatest clearance between the ground and the towing device 28, it is preferred to minimize the distance "d" between the sub-frame 30 and the underframe 50 when the towing device 28 is placed in the stowed position, shown more clearly in FIG. 3. To that end, hydraulic cylinders 60 are placed in a fully retracted position, placing the girder 56 adjacent to the chassis 34 of the towing vehicle 36. Finally, to render the towing device 28 functional for towing purposes while in the stowed position, a tow ball 116 may be attached to the cross member 82 so as to protrude from the rear portion 42 of the towing vehicle 36. In this fashion, the towing device 28 may be stowed underneath the towing vehicle 36 to which it is attached.

Figure 5:
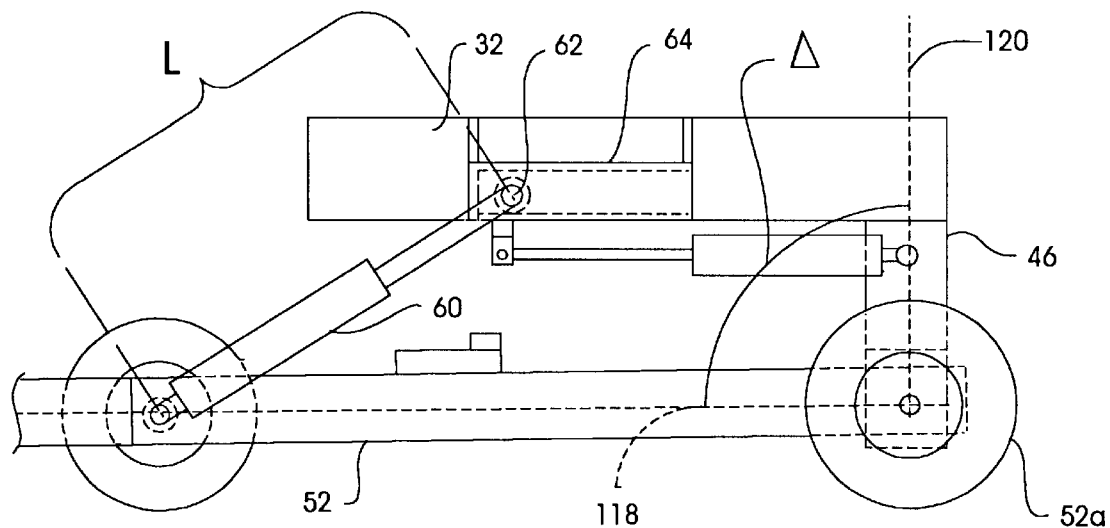
FIG. 5 is a detailed side view showing pivotal movement between a telescoping beam and a sub-frame of the invention shown in FIG. 1.

Referring to FIGS. 1, 2 and 5, in operation, the hydraulic cylinders 60 are activated to increase the distance "d" between the sub-frame 30 and the underframe 50. This provides a sufficient amount of clearance between the underframe 50 and the chassis 34 of the towing vehicle 36 to allow operation of the beam 68 and carriage 78. Hydraulic mechanism 60 is activated to extend the shaft 72 from the housing 70. Hydraulic mechanism 60 is preferably an electro-hydraulic device which allows selectively fixing distance "d", changing length "l" of hydraulic mechanism 60. The length "l, however, does not vary dynamically once fixed but is changed only by activation of the electro-hydraulic circuitry associated therewith. The shaft 72 is extended, along direction A, a sufficient distance so that the front of the towed vehicle 112 will clear the rear portion 42 of the towing vehicle 36. After the shaft 72 has been extended to provide the beam 68 with the desired length, the detents 96 are removed from the yoke 86. This allows the guide rod 84 to pivot about axis 88 in order to position the support structure 102 so that the cross member 82 is located between the girder 56 and the support structures 102. To increase the distance between the towed vehicle and the towing vehicle, the locking pin 100 may be extracted from one of the apertures 98 in the guide rod 84, thereby allowing the hollow tube 92 to move along direction B, outwardly away form cross member 82. Thereafter, hydraulic cylinders 60 are activated to lower the support structures 102 to the ground. The vehicle to be towed 112 is then driven onto the carriage so that its tires 110 rest within the recess 108. The tires are securely affixed to the carriage by the harness assembly 114.

Upon affixing tires 110 to the support structure 102, carriage 78 is then placed in a towing position by retracting hydraulic cylinders 60, thereby pivoting underframe 50 about axis 54. In this position, longitudinal axis 118 of the lever arms forms an angle Δ with respect to the longitudinal axis 120 of headstock. On level ground, angle Δ is approximately 90° and is proportional to an angle Φ. Angle Φ corresponds to an angle that longitudinal axis 122 of the towed vehicle 112 forms with respect to the longitudinal axis 40 of the towing vehicle 36.

A problem overcome by the present invention concerns high centering of the rear wheels 44 of the towing vehicle, causing the same to lift off from, or be elevated above, the ground 124. This may cause catastrophic failure of the towing device 28 and/or damage to both vehicles. High centering typically occurs when the two vehicles traverse over uneven terrain, e.g., such as a dip in the ground. Were angle Φ fixed, this could cause the rear wheels 44 to be elevated above the ground 124, with the towing device 28 being subjected to the combined weight of the towed and towing vehicles. In this situation, the towing and towed vehicles 36 and 112 are supported by the front wheels (not shown) of the towing vehicle 36 and the rear wheels (not shown) of the towed vehicle 112.

The present invention avoids high centering by attaching beam 68 so as to pivot about axis 61. Specifically, as tires 44 of towing vehicle 36 roll downwardly into a dip, axis 40 forms an oblique angle with respect to the ground 124. With girder 56, and therefore beam 68, pivoting about axis 61, rear wheels 44 are allowed to roll through and follow the contour of the dip. Were rotation of girder 56 about axis 61 precluded, angle Φ would be fixed, thereby increasing the effective length of the towing vehicle 36. With wheels 44 disposed between front wheels (not shown) of the towing vehicle 36 and rear wheels (not shown) of the towed vehicle 112, it is clear that situations may arise where the aforementioned vehicles traverse over uneven terrain resulting in wheels 44 being elevated off the ground. This would cause the combined weight of the vehicles to be supported between the front wheels of the towing vehicle and the rear wheels of the towed vehicle, greatly increasing the risk of damage to the towing device 28 or the vehicles. By allowing girder 56 to pivot, angle Φ is allowed to dynamically vary so as to prevent wheels 44 from being lifted off the ground, thereby avoiding the aforementioned risk of damage.

The aforementioned modified sliding block assembly allows angle Δ to vary dynamically in order to provide greater vertical clearance between the towing device 28 and the ground 124 when traversing over uneven terrain. As discussed above, as tires 44 of towing vehicle 36 traverse a dip, axis 40 forms an oblique angle with the ground 124. Should underframe 50 impact with the ground 124, lever arms 52 pivot about axis 54 toward the sub-frame 30, decreasing angle Δ. Pivoting of lever arms 52 is facilitated by the pivotal attachment of cylinders 60 thereto, as well as the movement of link 62 in bearing box 64. In this fashion, as rear portion 42 angles downwardly towards the ground, angle Δ decreases, providing greater clearance between the ground 124 and the towing device 28. Two pairs of wheels 52a are mounted to the underframe 50 to contact the ground 124 when angle Δ varies, thereby reducing friction between towing device 28 and the ground 124, shown more clearly in FIG. 4.

An additional benefit provided by the present invention results from having bearing member 58 straitened between the second journal portion of beam 68 and chassis 34. This configuration limits the rotational movement of the beam 68 about axis 61 so that in the absence of forces exerted upwardly on carriage 78 toward sub-frame 30, beam 68 extends substantially parallel to lever arms 52. This configuration also reduces the bending movement exerted on the beam 68. With a reduction of the bending movement, the strength requirements for the beam 68 may be substantially reduced, facilitating construction of a lightweight beam which may be easily stowed underneath the towing vehicle, as discussed above.

Figure 6:
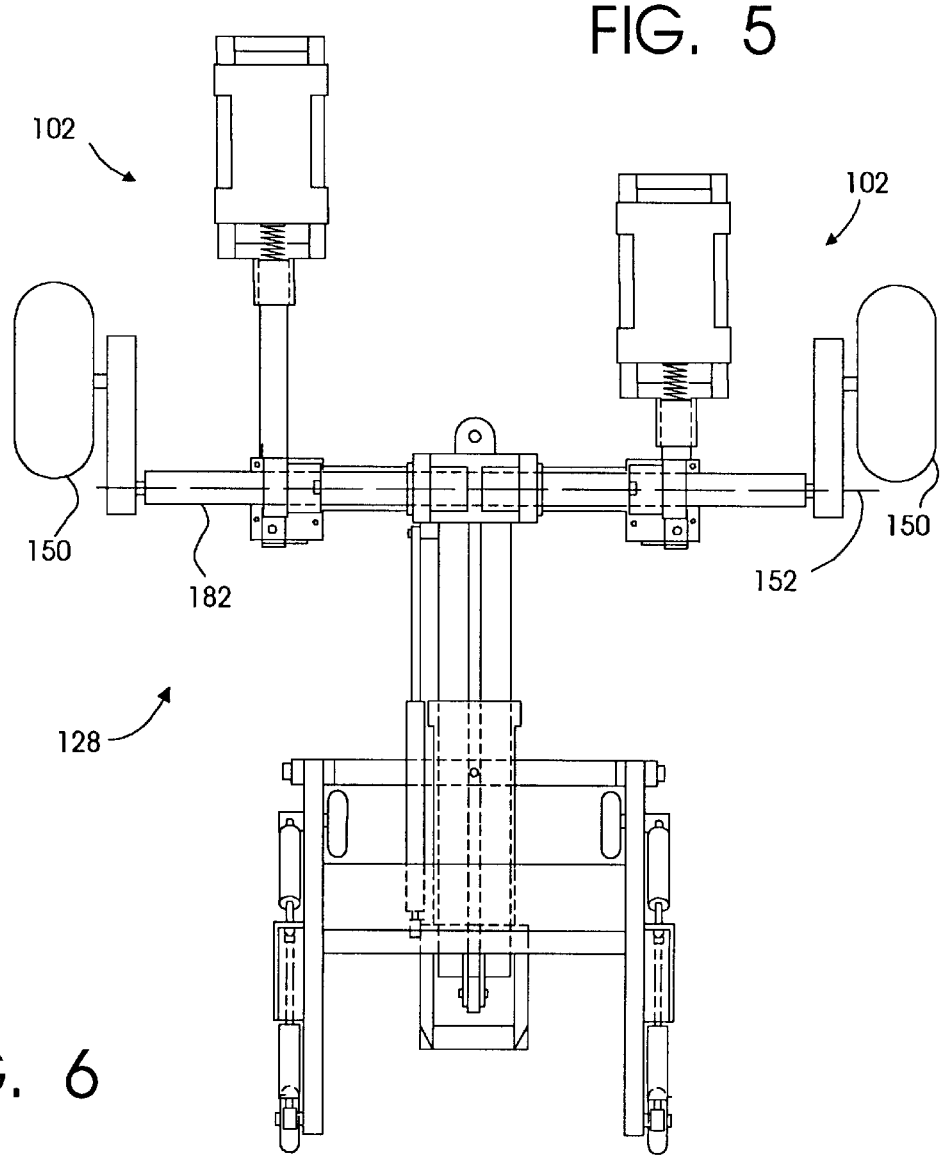
FIG. 6 is a top down view of an alternate embodiment of the towing device shown in FIG. 2.

Referring to FIG. 6, an alternate embodiment of the towing device 128 is shown in which carriage 178 includes a pair of dolly wheels 150 disposed at opposite ends of cross member 182. The dolly wheels 150 are provided to facilitate support of a load that would otherwise be too heavy for beam 68 to support without the presence of the dolly wheels 150. The dolly wheels 150 are disposed to rotate about the longitudinal axis 152 of the cross member 182. In the loading position, the dolly wheels 150 are positioned between the ground and the support structures 102. In the stored position, the dolly wheels 150 are rotated about axis 152 to allow support structure 102 to pivot about axis 88, as discussed above.

We claim:

1. A device for towing vehicles having wheels, said device adapted to be mounted onto a vehicle having a chassis with a longitudinal axis, said device comprising:

a sub-frame having a pair of spaced-apart parallel L-braces for mounting said sub-frame to said chassis, wherein a portion of each of the L-braces forms a headstock, said sub-framre having a longitudinal axis parallel to the longitudinal axis of said chassis, an underframed pivotally coupled to said sub-frame to rotate about a first axis, said first axis being transverse to the longitudinal axis of the sub-frame, said underframe including a pair of trunnions, each connected to one of the headstocks of the sub-frame, said underframe also including two lever arms extending parallel to the longitudinal axis of said sub-frame, and further including a girder extending between said lever arms and pivotally mounted thereto to rotate about a second axis which extends transverse to said longitudinal axis of the sub-frame, and further including a bearing member extending between the lever arms, parallel to said girder and positioned between said tunnions and said girder, a telescoping beam pivotally connected to said girder to rotate about a third axis, with said third axis extending traverse to said second axis, said beam including a housing and a shaft, said housing having first and second journal portions on opposing sides of the beam, said first journal portion being on a first surface of the housing and resting against said girder at the third axis and said second journal portion being on a top surface of the housing and resting against the bearing member to form a bi-planar rotation mechanism, a carriage coupled to said beam, with said carriage adapted to support said wheels, and a retraction mechanism, attached between sub-frame and said underframe, said retraction mechanism including a pair of spaced-apart bearing boxes attached to said sub-frame and a pair of spaced-apart journals having opposed ends, each of said bearing boxes having a length, with one end of each of said journals being disposed within a bearing box and having leans for moving along said length of said bearing box, and the opposing end of each of said journals being coupled to one of said lever arms of said underframe.

2. The device as recited in claim 1 wherein said retraction mechanism includes a resilient member coupled between said sub-frame and one of said journals to resiliently bias said one of said journals toward one end of one of said bearing boxes.

3. The device as recited in claim 1 wherein said beam includes a housing and a shaft and wherein a hydraulic mechanism is connected between said underframe and said carriage, said hydraulic mechanism serving to move said shaft for telescoping said beam between a collapsed position and an extended position, with said carriage being disposed adjacent to said underframe upon said beam reaching said collapsed position and said carriage being distally positioned with respect to said underframe when said beam is in said elongated position.

4. The device as recited in claim 1 wherein said carriage includes two spaced-apart telescoping members, each of which has a second longitudinal axis and terminates in a support plate, with each of said support plates having a means for resiliently biasing the support plates to move parallel to said longitudinal axis and adapted to receive one of said wheels.

5. The device as recited in claim 1 further including a first hydraulic means coupled between said underframe and said sub-frame to move said underframe between a retracted position, adjacent to said sub-frame, and an extended position, distal from said sub-frame.

6. The device as recited in claim 3 further including a second hydraulic means, coupled between said beam and said underframe to move said beam between said extended and collapsed positions.

7. The device as recited in claim 4 wherein each of said telescoping members rotate in the range of 120° to 180° between a stored position and a loading position, with said stored position being adjacent to said beam and said loading position being distal to said beam.

8. The device as recited in claim 4 further including first and second hydraulic means, with said first hydraulic means coupled between said underframe and said sub-frame to move said underframe between a retracted position, adjacent to said sub-frame, and an extended position, distal from said sub-frame, said second hydraulic means coupled between said bean and said underframe to move said beam between said extended and collapsed positions.

* * * * *

UNITED STATES PATENT AND TRADEMARK OFFICE
CERTIFICATE OF CORRECTION

PATENT NO : 5,984,616
DATED : November 16, 1999
INVENTOR(S): Gordon D. Youmans, et al.

It is certified that error appears in the above-identified patent and that said Letters Patent is hereby corrected as shown below:

Claim 1, column 8, line 2, "sub-framre"
    should read --- sub-frame ---.

Claim 1, column 8, line 37, "having leans"
    should read -- having means ---.

Signed and Sealed this

Twentieth Day of March, 2001

Attest:

NICHOLAS P. GODICI

Attesting Officer    Acting Director of the United States Patent and Trademark Office